United States Patent
LaBerge et al.

(10) Patent No.: US 6,526,497 B1
(45) Date of Patent: *Feb. 25, 2003

(54) MEMORY CACHE WITH SEQUENTIAL PAGE INDICATORS

(75) Inventors: Paul A. LaBerge, Shoreview, MN (US); Douglas A. Larson, Lakeville, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,318

(22) Filed: Aug. 20, 2001

Related U.S. Application Data

(63) Continuation of application No. 09/383,468, filed on Aug. 26, 1999.

(51) Int. Cl.[7] ............................................. G06F 12/10
(52) U.S. Cl. ............................................. 711/207
(58) Field of Search .................................. 711/202, 203, 711/206, 207; 345/568

(56) References Cited

U.S. PATENT DOCUMENTS

| | | | | |
|---|---|---|---|---|
| 5,598,553 A | * | 1/1997 | Richter et al. | 703/23 |
| 5,940,089 A | * | 8/1999 | Dilliplane et al. | 345/553 |
| 6,069,638 A | * | 5/2000 | Porterfield | 345/568 |
| 6,157,398 A | * | 12/2000 | Jeddeloh | 345/532 |

* cited by examiner

*Primary Examiner*—Kevin L. Ellis
(74) *Attorney, Agent, or Firm*—Trop, Pruner&Hu, P.C.

(57) ABSTRACT

A memory for storing address translation data includes one or more page table entry structures. Each page table entry structure includes a base address field to identify an allocated page of memory, a prior page field to identify zero or more allocated pages of memory that are sequential to and before that page of memory identified by the base address field, and a subsequent page field to identify zero or more allocated pages of memory that are sequential to and after that page identified by the base address field.

15 Claims, 4 Drawing Sheets

MEMORY CACHE WITH SEQUENTIAL PAGE INDICATORS

CROSS-REFERENCE TO RELATED APPLICATION

This is a continuation of U.S. Ser. No. 09/383,468, filed Aug. 26, 1999.

BACKGROUND

The invention relates generally to computer system memory architectures and more particularly, but not by way of limitation, to a translation-lookaside buffer incorporating sequential physical memory page indications.

Referring to FIG. 1, conventional computer system 100 providing accelerated graphics port (AGP) capability includes graphics accelerator 102 coupled to graphics device 104, local frame buffer memory 106, and bridge circuit 108. Bridge circuit 108, in turn, provides electrical and functional coupling between graphics accelerator 102, system memory 110, processor: 112, and system bus 114. For example, computer system 100 may be a special purpose graphics workstation, a desktop personal computer or a portable personal computer, graphics device 104 may be a display monitor, processor 112 may be a PENTIUM® processor, system memory 110 may be synchronous dynamic random access memory (SDRAM), and system bus 114 may operate in conformance with the Peripheral Component Interconnect (PCI) specification.

In accordance with the AGP specification, graphics accelerator 102 may use both local frame buffer 106 and system memory 110 as primary graphics memory. (See the Accelerated Graphics Port Interface Specification, revision 2.0, 1998, available from Intel Corporation.) As a consequence, AGP bus 116 operations tend to be short, random accesses. Because graphics accelerator 102 may generate direct references into system memory 110, a contiguous view of system memory is needed. However, since system memory 110 is dynamically allocated (typically in 4 kilobyte pages), it is generally not possible to provide graphics accelerator 102 with a single continuous memory region within system memory 110. Thus, it is necessary to provide an address remapping mechanism which insures graphics accelerator 102 will have a contiguous view of graphics data structures dynamically allocated and stored in system memory 110.

Address remapping is accomplished through Graphics Address Remapping Table (GART) 118. Referring now to FIG. 2, a contiguous range of addresses 200 (referred to as logical addresses) is mapped 202 by GART 118 to a series of typically discontinuous pages in physical memory 110 (referred to as physical addresses). Each open page of physical memory within GART range 200 has a GART entry (referred to as a page table entry).

To speed memory access operations, bridge circuit 108 commonly caches up to a specified maximum number (e.g., 32) of GART page table entries in translation-lookaside buffer 120 (TLB, see FIG. 1). Once TLB 120 is fully populated, if graphics accelerator 102 attempts to access a page not identified by a TLB entry, a cache miss occurs. When a cache miss occurs, that page table entry in GART 118 providing the necessary address remapping information is identified, retrieved by bridge circuit 108, used to obtain the requested data, and replaces a selected entry in TLB 120. The specific page table entry in TLB 120 to replace may be determined by any desired replacement algorithm. For example, least recently used or working set cache replacement algorithms may be used. Each TLB cache miss may cause graphics accelerator 102 to temporarily slow or stop processing. Thus, it would be beneficial to provide a mechanism to reduce the number of TLB cache miss operations.

SUMMARY

In general, according to one embodiment, a method of performing address translation includes storing a portion of an address mapping table, storing a first value in the portion to indicate a base address of a first allocated page of memory, storing a second value in the portion to indicate zero or more allocated pages of memory that are sequential to and before the first page of memory, and storing a third value in the portion to indicate zero or more allocated pages of memory that are sequential to and after the first page of memory. An address is translated based on the portion of the address mapping table.

Other or alternative features will become apparent from the following description, from the drawings, or from the claims.

DETAILED DESCRIPTION

A cache whose entries indicate the amount of allocated physical memory that is sequential to (before and after) that memory identified by the cache entry is described. The following embodiments, described in terms of an Accelerated Graphics Port (AGP) translation-lookaside buffer (TLB) cache, are illustrative only and are not to be considered limiting in any respect.

Figure 1:
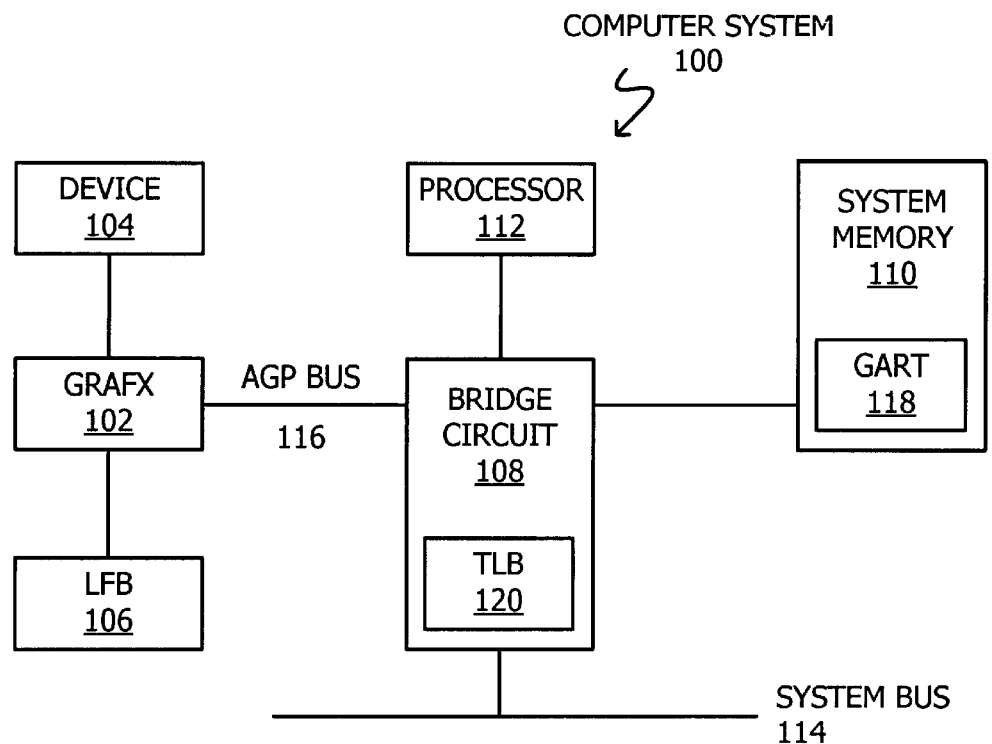
FIG. 1 shows a prior art graphics capable computer system.
Figure 2:
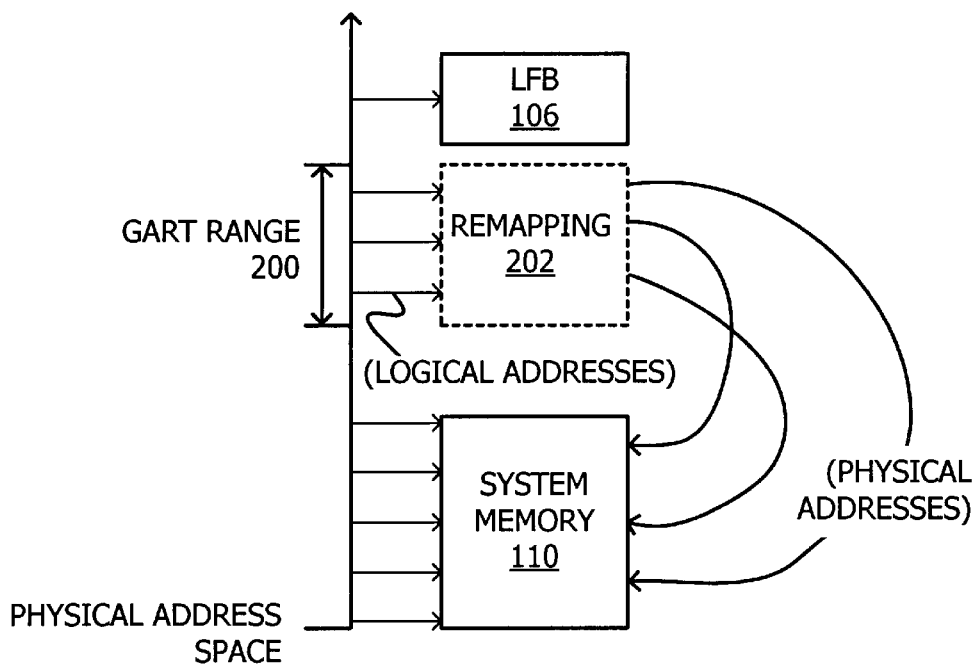
FIG. 2 illustrates how a Graphics Address Remapping Table (GART) maps a contiguous range of physical addresses to a series of non-contiguous pages in system memory.
Figure 3:
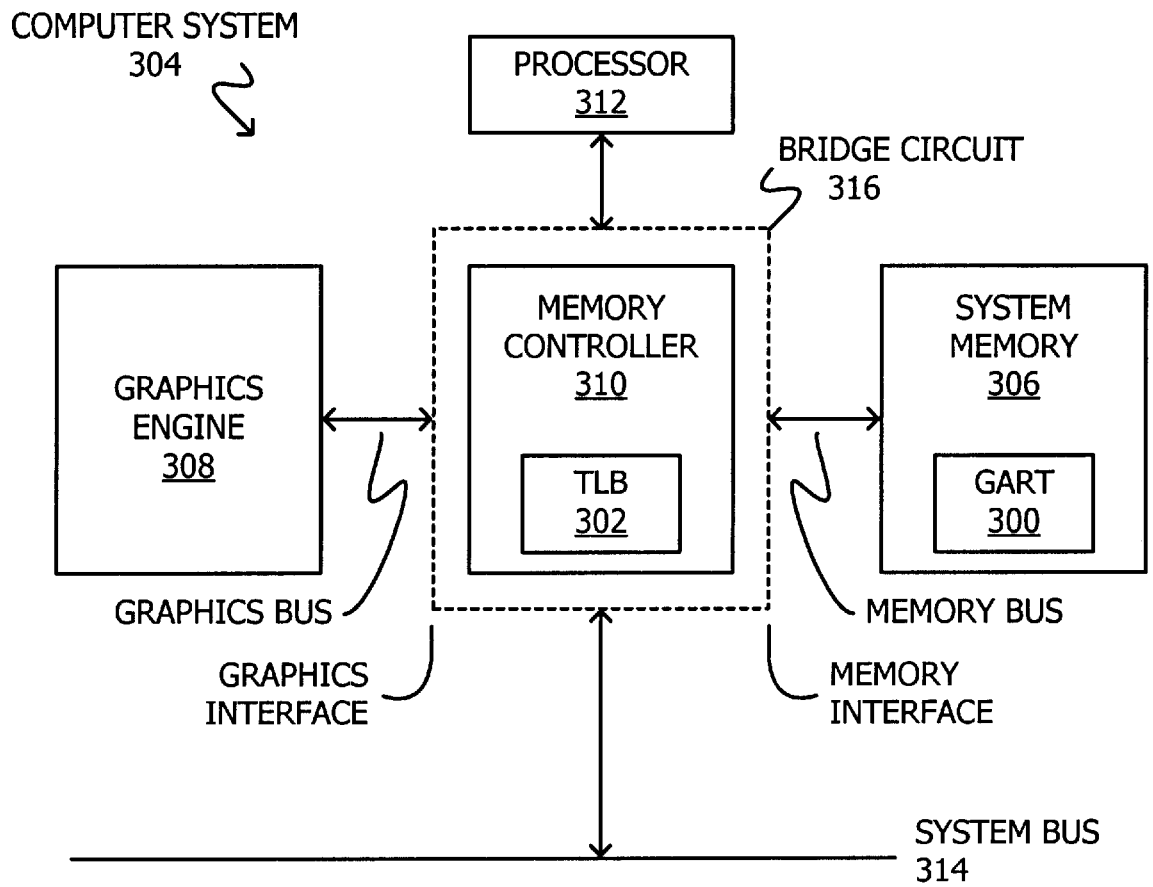
FIG. 3 shows a computer system incorporating a GART and translation-lookaside buffer cache in accordance with one embodiment of the invention.

Referring to FIG. 3, Graphics Address Remapping Table (GART) 300 and TLB 302 in accordance with one embodiment of the invention are elements of graphics capable computer system 304. Each page (typically 4 kilobytes in size) of system memory 306 allocated to graphics engine 308 has a page table entry in GART 300. Memory controller 310, to speed memory access operations, may use TLB 302 to cache a selected subset of GART page table entries. For example, TLB 302 may include a maximum of 32 entries. In one embodiment, TLB entries are stored in special purpose hardware registers in memory controller 310. In another embodiment, TLB entries may be stored in random access memory internal to memory controller 310 (or bridge circuit 316). As shown, computer system 304 may further include one or more processor units 312 and system bus 314. Further, memory controller 310 may be incorporated within bridge circuit 316.

Graphics engine 308 typically requests, and is allocated, multiple pages of memory at a time. Because of this, it is often the case that a number of sequential physical memory pages are allocated to graphics engine 308. This sequential characteristic of allocated system memory may be recorded in GART 300 and TLB 302 and used by memory controller 310 to effectively extend the number of page table entries covered by TLB 302. This, in turn, may reduce the number of TLB cache miss operations and thereby improve computer system performance.

Figure 4:
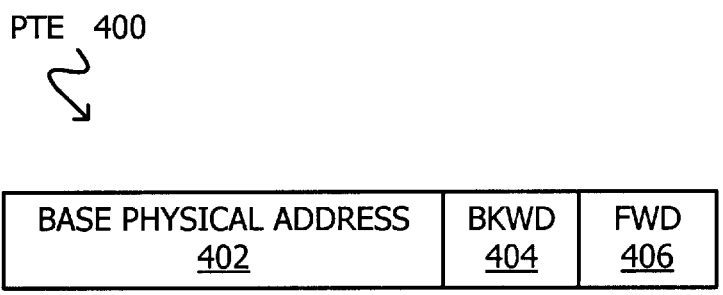
FIG. 4 shows a page table entry in accordance with one embodiment of the invention.

Referring to FIG. 4, page table entry (PTE) 400 in accordance with one embodiment of the invention includes base physical address field 402, prior sequential page field 404, and subsequent sequential page field 406. Base physical address field 402 represents the physical address of an allocated page in system memory 306. For example, if computer system 304 uses 32-bit addresses, and memory controller 310 partitions system memory 306 into 4 kilobyte pages, base physical address field 402 may be 20-bits. Prior sequential page field 404 indicates the number of allocated pages that are sequential to and before (i.e., having a lower memory address) that page identified in base physical address field 402. Subsequent page indication field 406 indicates the number of allocated pages that are sequential to and after (i.e., having a higher memory address) that page identified in base physical address field 402.

In one embodiment, prior and sequential page indication fields 404 and 406 may encode a value representing the number of prior and subsequent sequential pages. In this embodiment, 8-bit fields provide sufficient range to span 510 pages of memory—nearly 2 megabytes (255 prior pages and 255 subsequent pages). In another embodiment, prior and sequential page indication fields 404 and 406 may encode the page address of the first and last pages respectively in the sequence of allocated pages. In this embodiment, prior and subsequent sequential page fields are large enough to encode a page address (e.g., 20 bits).

Figure 5:
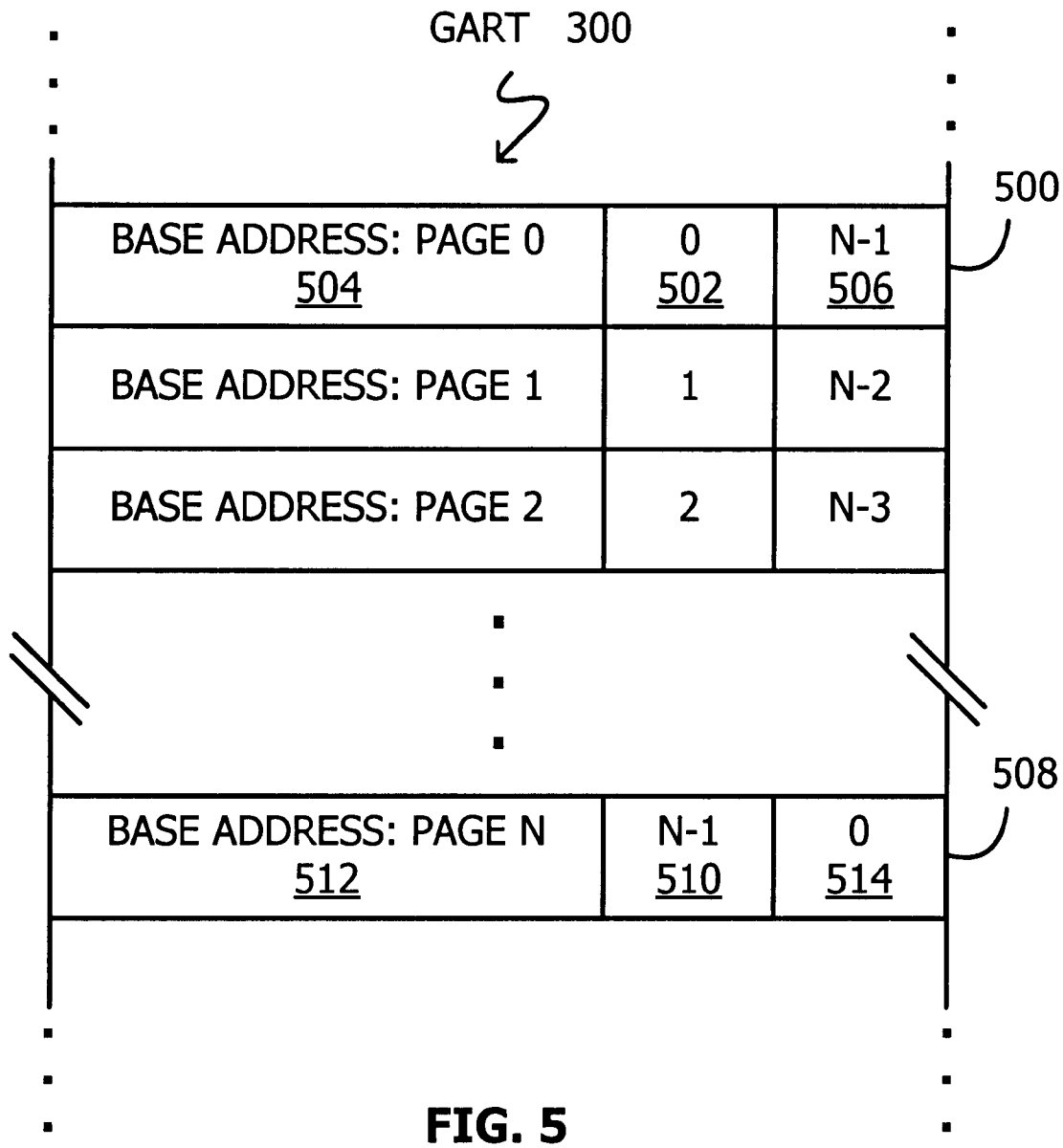
FIG. 5 shows a GART having N page table entries representing N sequentially allocated pages of memory in accordance with one embodiment of the invention.

Referring to FIG. 5, N sequentially allocated pages of memory may be represented in GART 300 by N page table entries. If prior and subsequent sequential page fields 404 and 406 encode a page count, the first of the N page table entries (500) will have a prior sequential page field (502) value of 0 to indicate there are no allocated pages of memory prior and sequential to the page identified by base physical address field 504, and a subsequent sequential page field (506) value of N-1 to indicate there are N-1 allocated pages of memory following and sequential to the page identified by base physical address field 504. Similarly, the last of the N page table entries (508) has a prior sequential page field (510) value of N-1 to indicate there are N-1 allocated pages of memory prior and sequential to the page identified by base physical address field 512, and a subsequent sequential page field (514) value of 0 indicating there are no allocated pages of memory following and sequential to the page identified by base physical address field 512. (Thus, a PTE corresponding to-an allocated page of memory that is not sequential to another allocated page of memory has prior (404) and subsequent (406) field entry values of 0.)

Using prior (404) and subsequent (406) field entries, memory controller 310 may calculate the starting and ending physical address of any sequential block of allocated memory, the starting and ending logical addresses corresponding to those physical addresses (e.g., those addresses received by memory controller 310 from graphics engine 308), and the relative offset between a logical and physical address. Thus, using any one PTE from a sequential series of allocated memory pages, memory controller 310 may use the entry's prior (404) and subsequent (406) field values to perform address translation for any logical address in the range spanned by the sequential memory block.

Consider, for example, computer system 304 in which graphics engine 308 requests, and is allocated, a 4 megabyte buffer of memory. If memory controller 310 allocates memory in pages of 4 kilobytes, GART 300 would include 256 page table entries. If the allocated pages are sequentially ordered in system memory 306, however, TLB 302 could span the entire range in a single entry. Thus, once one of the 256 page table entries from GART 300 has been loaded into TLB 302, memory controller 310 may provide address translation for the entire 4 megabyte address range—no TLB cache miss operations would occur.

Figure 6:
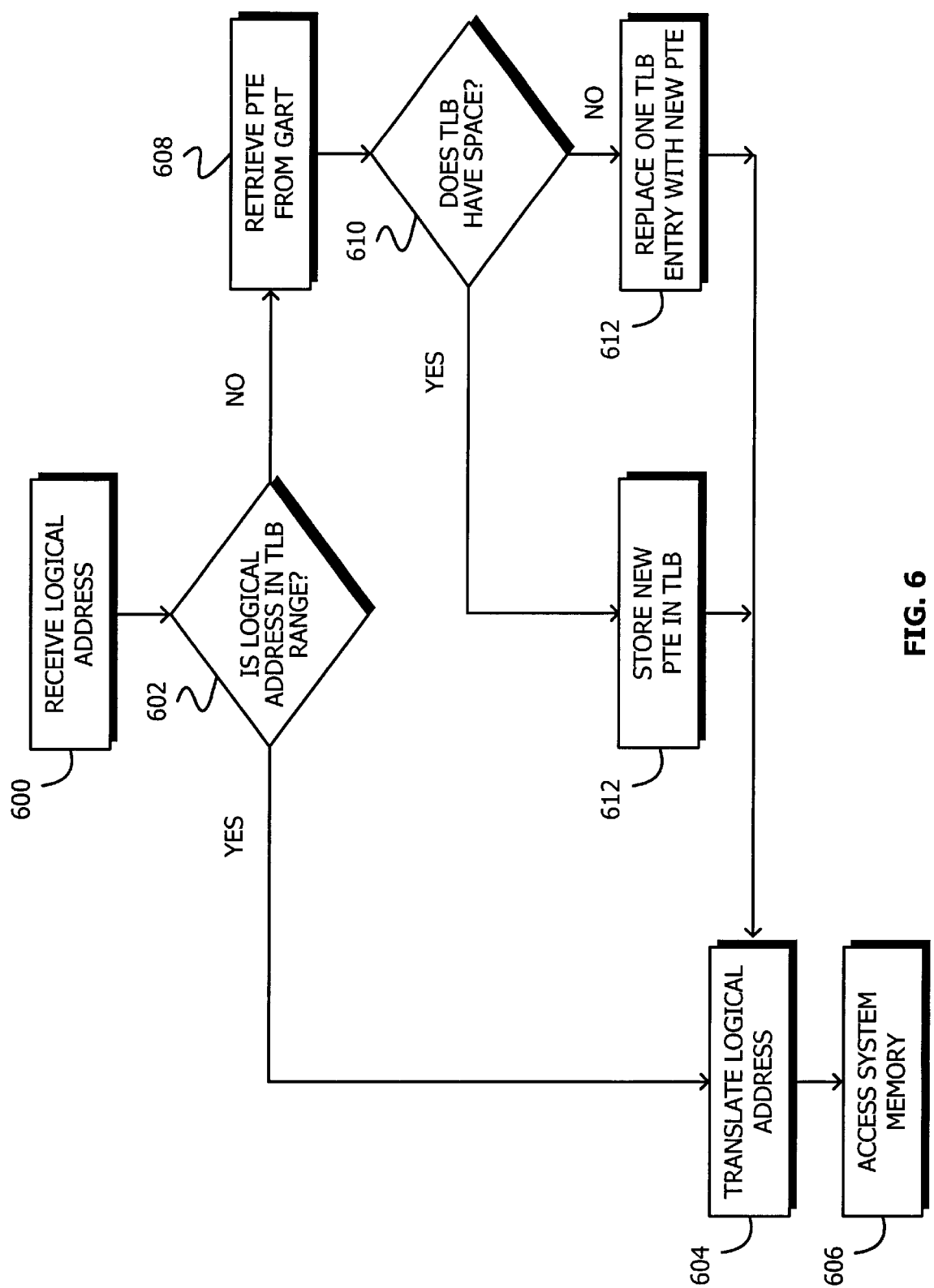
FIG. 6 shows a logical to physical address translation technique using page table entries in accordance with the invention.

Referring to FIG. 6, a logical to physical address translation technique using page table entries having prior and subsequent sequential memory fields in accordance with the invention is shown. A memory access operation is initiated when memory controller 310 receives a logical address from graphics engine 308 (block 600). Memory controller 310 then determines if the received logical address corresponds to an entry in TLB 302 (diamond 602). The requested page may be said to be covered by TLB 302 if any entry therein: (1) has a base physical address corresponding to the requested page, or (2) encompasses the requested page when its base physical address is expanded to incorporate those pages indicated by its prior or subsequent sequential page fields. If the requested page is covered by TLB 302 (the "yes" prong of diamond 602), the logical address may be immediately translated (block 604) and the resulting physical address used to access system memory 310 (block 606).

If the requested page is not covered by TLB 302 (the "no" prong of diamond 602), memory controller retrieves the appropriate page table entry from GART 300 (block 608). If TLB 302 has space available for the new PTE (the "yes" prong of diamond 610), the new PTE is stored (block 612), the received logical address is translated (block 604), and the resulting physical address is used to access system memory (block 606). If TLB 302 does not have space available for the new PTE (the "no" prong of diamond 610), an existing entry in TLB 302 is selectively replaced by that entry retrieved during the act of block 608 (block 614). While any cache replacement algorithm may be used, an industry standard technique is to replace that TLB cache entry that was least recently used. Once TLB 302 has been updated, address translation and memory access may proceed as indicated in blocks 604 and 606.

One benefit of page table entries in accordance with the invention is that multiple sequentially allocated pages may be represented by a single TLB entry in memory controller 310. This may allow a TLB of a given size to provide better coverage (i.e., a higher cache hit rate) than a prior art TLB not using prior and subsequent field entries. This, in turn, may improve system performance when address translation is required. Another benefit of a page table entry in accordance with the invention is that their use may reduce the number of TLB entries cached in memory controller 310, thereby conserving memory resources within bridge circuit 316.

While the invention has been disclosed with respect to a limited number of embodiments, numerous modifications and variations will be appreciated by those skilled in the art. For instance, a circuit to maintain TLB 302 may be integral to memory controller 310 as described herein, or it may be distinct from memory controller. That is, TLB control may be performed by a circuit that interfaces to memory controller 310. Further, memory controller 310 and/or a TLB maintenance circuit may be incorporated within bridge circuit 316 (typically implemented as an application specific integrated circuits, or ASIC), or it may be a stand-alone circuit, or it may be incorporated within a memory module providing system memory 306. It is intended, therefore, that the following claims cover all such modifications and variations that may fall within the true sprit and scope of the invention.

What is claimed is:

1. A method of performing address translation, comprising:
    storing a plurality of page table entry data structures, each page table entry data structure comprising:
        a base field to identify an allocated page of memory,
        a prior page field to identify zero or more allocated pages of memory that are sequential to and before that page of memory identified by the base address field, and
        a subsequent page field to identify zero or more allocated pages of memory that are sequential to and after that page identified by the base address field; and
    accessing data in the memory using the page table entry data structures.

2. The method of claim 1, wherein storing the page table entry data structures comprises storing prior page fields each encoding a value indicating a number of allocated pages of memory that are sequential to and before that page of memory identified by the base address field.

3. The memory of claim 1, wherein storing the page table entry data structures comprises storing prior page fields each encoding a value indicating a page address of a page of memory that is before the page of memory identified by the base address field.

4. The method of claim 1, wherein storing the page table entry data structures comprises storing subsequent page fields each encoding a value indicating a number of allocated pages of memory that are sequential to and after that page of memory identified by the base address field.

5. The method of claim 1, wherein storing the page table entry data structures comprises storing subsequent page fields encoding a value indicating a page address of a page of memory that is sequential to and after that page of memory identified by the base address field.

6. The method of claim 1, wherein storing the plurality of page table entry data structures comprises storing a portion of a graphics address remapping table.

7. The method of claim 1, wherein storing the plurality of page table entry data structures comprises storing a translation-lookaside buffer cache.

8. A method of performing address translation, comprising:
    storing a portion of an address mapping table;
    storing a first value in the portion to indicate a base address of a first allocated page of memory;
    storing a second value in the portion to indicate zero or more allocated pages of memory that are sequential to and before the first page of memory;
    storing a third value in the portion to indicate zero or more allocated pages of memory that are sequential to and after the first page of memory; and
    translating an address based on the portion of the address mapping table.

9. The method of claim 8, wherein storing the portion of the address mapping table comprises storing a portion of a graphics address remapping table.

10. The method of claim 8, wherein storing the portion of the address mapping table comprises-storing a translation-lookaside buffer.

11. The method of claim 10, further comprising receiving a logical address, wherein translating the address comprises translating the logical address using the translation-lookaside buffer.

12. The method of claim 11, further comprising using the translated address to access the memory.

13. The method of claim 11, further comprising determining if the received logical address corresponds to an entry in the translation-lookaside buffer.

14. The method of claim 13, further comprising updating the translation-lookaside buffer if the received logical address does not correspond to any entry in the translation-lookaside buffer.

15. The method of claim 14, further comprising retrieving information from the memory to update the translation-lookaside buffer.

* * * * *